United States Patent
Kasai et al.

(10) Patent No.: US 7,984,786 B2
(45) Date of Patent: Jul. 26, 2011

(54) ELECTRIC POWER STEERING DEVICE

(75) Inventors: Eiji Kasai, Toyota (JP); Ippei Yamazaki, Toyota (JP); Shuji Fujita, Nishikamo-gun (JP); Yuichiro Ido, Nishikamo-gun (JP); Yutaka Aoki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 786 days.

(21) Appl. No.: 11/993,149

(22) PCT Filed: Oct. 19, 2006

(86) PCT No.: PCT/IB2006/002918
§ 371 (c)(1),
(2), (4) Date: Dec. 19, 2007

(87) PCT Pub. No.: WO2007/045973
PCT Pub. Date: Apr. 26, 2007

(65) Prior Publication Data
US 2010/0044146 A1    Feb. 25, 2010

(30) Foreign Application Priority Data
Oct. 21, 2005 (JP) .................................. 2005-306627

(51) Int. Cl.
B62D 5/04 (2006.01)
B62D 6/00 (2006.01)
(52) U.S. Cl. .......................... 180/446; 180/443; 701/42
(58) Field of Classification Search .................. 180/443, 180/446; 701/41, 42, 43; 261/154, 235, 261/242; 290/7
See application file for complete search history.

(56) References Cited

U.S. PATENT DOCUMENTS

| 4,756,375 | A | | 7/1988 | Ishikura et al. |
| 4,943,758 | A | * | 7/1990 | Tsurumiya ..................... 318/504 |
| 5,150,021 | A | * | 9/1992 | Kamono et al. ............... 318/488 |
| 6,274,999 | B1 | * | 8/2001 | Fujii et al. ....................... 318/807 |
| 6,426,671 | B1 | * | 7/2002 | Kono ............................. 327/541 |
| 6,731,082 | B2 | * | 5/2004 | Pelonis ..................... 318/400.26 |
| 6,795,762 | B2 | * | 9/2004 | Itoh et al. ......................... 701/43 |
| 7,016,775 | B2 | * | 3/2006 | Iwazawa et al. ................. 701/41 |
| 7,163,080 | B2 | * | 1/2007 | Fardoun et al. ............... 180/446 |
| 7,389,851 | B2 | * | 6/2008 | Miyaura ....................... 180/446 |
| 2001/0027895 | A1 | | 10/2001 | Murata et al. |

FOREIGN PATENT DOCUMENTS

| JP | 1-248990 | 10/1989 |
| JP | 8 216910 | 8/1996 |
| JP | 2000 198457 | 7/2000 |
| JP | 2001-171540 | 6/2001 |
| JP | 2001-258168 | 9/2001 |
| JP | 2002-154452 | 5/2002 |

(Continued)

*Primary Examiner* — Kevin Hurley
*Assistant Examiner* — Daniel Yeagley
(74) *Attorney, Agent, or Firm* — Oblon, Spivak, McClelland, Maier & Neustadt, L.L.P.

(57) ABSTRACT

An electric power steering device, including an electric motor supplied with power from a power supply device to generate a predetermined steering assistance force for a steered wheel, and an assistance control device the controls the amount of electrical power supplied to the electric motor, according to the steering state of a steering wheel. The assistance control device detects the power supply voltage of the power supply device. The assistance control device controls the electrical current supplied to the electric motor, so as to maintain the power supply voltage greater than or equal to a set voltage which is set in advance.

16 Claims, 13 Drawing Sheets

FOREIGN PATENT DOCUMENTS

| | | |
|---|---|---|
| JP | 2003-175836 | 6/2003 |
| JP | 2003 312510 | 11/2003 |
| JP | 2005 7991 | 1/2005 |
| JP | 2005 67414 | 3/2005 |
| JP | 2005-170225 | 6/2005 |
| JP | 2005 193751 | 7/2005 |

* cited by examiner

ELECTRIC POWER STEERING DEVICE

BACKGROUND OF THE INVENTION

1. Field of the Invention

The present invention relates to an electric power steering device comprising an electric actuator, such as an electric motor or the like, which imparts steering force to steered wheels according to rotational actuation of a steering wheel.

2. Description of Related Art

It has been known for this sort of electric power steering device to include an electric motor which imparts a steering assistance force upon rotational actuation of the steering wheel, and this steering assistance force is adjusted by controlling the electrical current which is supplied to this electric motor. While the battery which is fitted to the vehicle is used as a power supply for this type of electric power steering device, if the amount of electric power consumption has become quite large and the capability of the battery (i.e. the battery voltage) has decreased, then the supply of electrical power to the electric motor which generates the steering assistance force is stopped in order to prevent decrease of the power supply voltage. In this case, the assistance function is not restored until the power supply voltage rises above a predetermined voltage. Moreover, the power supply voltage which is required for again starting the assistance function is set to be quite high, in order to prevent occurrence of the hunting phenomenon in which, when the power supply voltage is restored and the assistance function starts again, the power supply voltage again decreases. Accordingly, the time period over which assistance is interrupted becomes undesirably long.

Furthermore, a system is known in which it is arranged, during decrease of the power supply voltage, to limit the assistance torque provided by the electric motor. For example, with the electric power steering device disclosed in Japanese Patent Application Publication No. JP-A-2005-067414, a function is provided of decreasing the assistance torque, when the power supply voltage decreases, by arranging to multiply the assistance torque by an assistance reduction gain, and to change over this assistance reduction gain according to the power supply voltage.

However, because the proportion of assistance reduction is set in advance in the system described in Japanese Patent Application Publication No. JP-A-2005-067414, if the change of the power supply voltage occurs quickly, it sometimes happens that decrease of voltage cannot be avoided.

In other words, because the device disclosed in Japanese Patent Application Publication No. JP-A-2005-067414 is one in which the assistance torque is simply reduced when the power supply voltage decreases and no control is performed to maintain the power supply voltage greater than or equal to a predetermined voltage, the power supply voltage simply decreases to the level at which operation is stopped, so that the steering assistance function is stopped, which is undesirable.

SUMMARY OF THE INVENTION

The present invention has been conceived in order to cope with the above described problem, and its object is to suppress decrease of the power supply voltage to the greatest extent possible, thus resuscitating the function of the electrical power steering system as much as possible.

In order to achieve the above described object, the present invention provides an electric power steering device, comprising: an electric actuator which is supplied with power from a power supply device to generate a predetermined steering assistance force for a steered wheel, and an actuator control means which controls the amount of electrical power supplied to the electric actuator, according to the steering state of a steering wheel, wherein the actuator control means comprise a power supply voltage detection means which detects the power supply voltage of the power supply device, and a voltage maintenance control means which controls the electrical current supplied to the electric actuator, to maintain the power supply voltage greater than or equal to a set voltage which is set in advance.

According to the present invention having the above-described structure, the electrical current that is supplied to the electric actuator is controlled to maintain the power supply voltage, which is detected by the power supply voltage detection means, greater than or equal to the set voltage. In other words, it is possible strongly to suppress decrease of the power supply voltage, since it is arranged to perform control to maintain the power supply voltage itself greater than or equal to the set voltage: in this aspect, the present invention differs from prior art systems.

As a result, along with preventing stoppage of the electric power steering function, it is also possible to drive the electric actuator in a satisfactory manner with an adequate voltage. Furthermore, since the electric power consumption from the power supply device is limited, it is also possible to prevent the fault that it may become impossible to provide the anticipated performance, due to an electric power shortage entailed by other electrical control systems also receiving supply of electric power in common from the same power supply device.

Furthermore, according to another aspect of the present invention, the voltage maintenance control means adjusts the electrical flow amount supplied to the electric actuator, based upon the deviation between the detected power supply voltage and the set voltage, and performs feedback control so that the power supply voltage becomes equal to the set voltage.

In this case, in the adjustment of the electrical flow amount supplied to the electric actuator, an upper limit value for the electric current that flows to the electric actuator may be adjusted.

According to this concept, it is possible to perform even more adequate electrical current limitation, since the upper limit value of the electrical flow amount (the upper limit electrical current value) that is supplied to the electric actuator is controlled based upon the deviation between the power supply voltage and the set voltage. In other words, since the control is based upon the deviation between the power supply voltage and the set voltage, accordingly the upper limit electrical current value for the electric actuator is set lower for a great decrease of the power supply voltage, so that quick decrease of the power supply voltage is suppressed, and, if the amount of decrease of the power supply voltage with respect to the set voltage is small, the limitation of the upper limit electrical current is relaxed, so that a large steering force by the electric actuator is ensured. Accordingly, by using the maximum limit of electric power, according to the power supply state from time to time, it is possible sufficiently to provide the electric power steering function.

Moreover, according to another aspect of the present invention, the voltage maintenance control means adjusts the upper limit electrical current for the electric actuator, and performs feedback control so that the power supply voltage becomes equal to the set voltage, based upon a proportional element and a differentiation element for the deviation between the detected power supply voltage and the set voltage, or based upon a proportional element for the deviation and a differentiation element for the power supply voltage.

Since, according to this concept, the upper limit electrical current value is adjusted by the action, not only of the proportional element, but also of the differentiation element, accordingly the responsiveness with respect to fluctuations of the power supply voltage becomes extremely high, so that it is possible quickly to suppress the decrease of the power supply voltage.

Furthermore, according to another aspect of the present invention, at least one of the proportional gain and the differential gain of the feedback control is set to values which are different between the case of performing control on the side to reduce the upper limit electrical current value of the electric actuator, and the case of performing control on the side to increase it.

In this case, at least one of the proportional gain and the differential gain is set to a value which is smaller in the case of performing control on the side to reduce the upper limit electrical current value of the electric actuator, than in the case of performing control on the side to increase it.

According to this concept, if the control is being performed on the side to reduce the upper limit electrical current value of the electric actuator, then, since its control gain is set to be high, accordingly the upper limit electrical current reduces quickly and the return increase of the power supply voltage becomes fast, so that it is possible to prevent the fault that the electric power steering function should be stopped due to an abrupt decrease in the power supply voltage, as in the prior art.

Furthermore, if control is performed to the side of elevating the power supply voltage and increasing the upper limit electrical current value for the electric actuator, then, since this control gain is set to be small, accordingly the upper limit electrical current value comes to be increased gradually, and it is possible to prevent hunting of the power supply voltage. In other words if, upon so called return increase of the power supply voltage, if the amount of electrical current provided to the electric actuator has increased abruptly, then there is a fear that a sudden decrease of the power supply voltage will be entailed along therewith, and, in such a case, hunting of the power supply voltage may occur, which is undesirable. By contrast since, with the present invention, the control gain is smaller when control is being performed to the side of reduction of the upper limit electrical current value for the electric actuator, as compared to the case of increase thereof, accordingly it is possible to prevent this type of hunting.

Furthermore, according to yet another aspect of the present invention, at least one of the proportional gain and the differential gain of the feedback control is set according to the detected power supply voltage.

Since, according to this concept, an appropriate control speed is obtained according to the power supply voltage, accordingly the electrical current is limited to be greater than or equal to the required electrical current, and, conversely, the fault is avoided, that the limitation of the electrical current should prove to be inadequate.

Furthermore, according to still another aspect of the present invention, the actuator control means operates the voltage maintenance control means, when the power supply voltage detected by the power supply voltage detection means has decreased down to a predetermined feedback control starting voltage.

Since, according to this concept, the voltage maintenance control means does not operate if the power supply voltage is greater than or equal to the feedback control starting voltage, accordingly limitation of the amount of electrical current provided to the electric actuator is not performed heedlessly, so that it is possible to perform limitation of the amount of electrical current provided to the electric actuator only when suppression of a decrease of the power supply voltage is required, and it does not happen that suppression of the electric power steering function is performed when it is unnecessary, which would be undesirable.

Furthermore, according to still yet another aspect of the present invention, when the detected power supply voltage has risen up to a feedback control ending voltage which is higher than the feedback control starting voltage, the actuator control means, along with terminating the feedback control, also increases the upper limit electrical current value for the electric actuator at a predetermined speed.

Since, according to this concept, even though feedback control is terminated, the upper limit electrical current to the electric actuator is not immediately returned to its maximum value when the power supply voltage is satisfactory, accordingly abrupt elevation of the amount of electrical power supplied to the electric actuator is suppressed, so that it is possible to prevent hunting of the power supply voltage. Moreover, it is possible to suppress change of the steering force.

Furthermore, according to even another aspect of the present invention, if the power supply voltage detected by the power supply voltage detection means is higher than a predetermined voltage, the voltage maintenance control means adjusts the upper limit electrical current value for the electric actuator, and performs feedback control so that the power supply voltage becomes equal to the set voltage, not based upon the differentiation element, but based upon the proportional element.

According to this concept, it is possible to start feedback control from a stage at which the power supply voltage is not very much decreased. In other words, if it is supposed that an abrupt decrease of the power supply voltage has occurred, then, although it will be acceptable to start the feedback control from a stage at which the power supply voltage has been satisfactory, in this type of case, the differentiation element works more than necessary upon the fluctuation of the power supply voltage and the upper limit electrical current value decreases excessively, which is undesirable, and there is a fear that it will become impossible to obtain a sufficient steering force. Thus since, with the present invention, it is arranged, if the power supply voltage is higher than a predetermined voltage, to perform feedback control based upon the proportional element, and not based upon the differentiation element, accordingly it is possible to start control for suppressing decrease of the power supply voltage, in other words, to start voltage maintenance control, from a stage at which the power supply voltage is high.

Moreover, according to yet another aspect of the present invention, there is further included a power supply maintenance means which, in response to decrease of the power supply voltage of the power supply device, slows down the decrease of the power supply voltage which is supplied to the actuator control means; and the voltage maintenance control means has a control responsiveness, if the power supply voltage has dropped below the minimum drive voltage of the actuator control means, which is faster than the time interval over which the power supply voltage to the actuator control means can be maintained greater than or equal to the minimum drive voltage by the power supply maintenance means.

Since, according to this concept, even if the power supply voltage of the power supply device drops below the minimum drive voltage for the actuator control means, the power supply to the actuator control means is maintained for just a predetermined period by the power supply maintenance means, and since the control responsiveness of the voltage maintenance control means is faster than this power supply maintenance period, accordingly it is possible to anticipate that the power supply voltage will be elevated by the voltage maintenance control means, before the power supply voltage to the actuator control means actually decreases. In other words, since the control responsiveness of the voltage maintenance control means, for example the cycle for feedback control, is faster than the power supply maintenance period by the power supply maintenance means, accordingly it is possible to anticipate that the power supply voltage will rise due to limitation of the electrical current by the voltage maintenance control means, before the power supply voltage to the actuator control means drops below the minimum drive voltage. As a result, even if momentary decrease of the power supply voltage or stoppage of the power supply occurs, the functioning of the actuator control means does not stop, which would be undesirable. Accordingly, it is possible to prevent the undesirable fault that the electric power steering function suddenly stops.

Furthermore, according to still another aspect of the present invention, there is further included a filter which eliminates noise included in the voltage signal detected by the power supply voltage detection means, or in the deviation signal between the detected power supply voltage and the set voltage.

According to this concept, it is possible to eliminate the influence of noise upon the power supply line, so that it is possible to detect the power supply voltage in an adequate manner. Moreover, it is possible to perform appropriate feedback control by eliminating small voltage fluctuations.

Furthermore, according to even yet another aspect of the present invention, when the detected power supply voltage has decreased down to a predetermined voltage, the voltage maintenance control means reduces the upper limit value of the electrical current supplied to the electric actuator at a predetermined speed, until the power supply voltage becomes greater than or equal to the set voltage.

Since, according to this concept, the upper limit value for the electrical current which is supplied to the electric actuator is reduced at a predetermined speed until the power supply voltage becomes greater than or equal to the set voltage, accordingly it is possible to ensure that the power supply voltage is greater than or equal to the set voltage in a reliable manner, and, along with it being possible to prevent interruption of the operation of the electric power steering function, it is also possible to drive the electric actuator in a satisfactory manner with an adequate voltage.

Moreover, according to a yet further aspect of the present invention, there is further included a vehicle speed detection means which detects the running speed of the vehicle, and the voltage maintenance control means determines the speed of reduction of the upper limit value of the electrical current supplied to the electric actuator, according to the detected vehicle speed.

In this case, the speed of reduction of the upper limit value of the electrical current supplied to the electric actuator may be slower when the detected vehicle speed is greater than a predetermined speed, as compared to when it is not greater than the predetermined speed.

Generally, decrease of the power supply voltage can easily be induced during steering in which a large steering force is required, as when the running speed of the vehicle is low, but since, according to the present invention, when the vehicle speed is slow, the speed of reduction of the upper limit value for the electrical current which is supplied to the actuator is higher, as compared to when the vehicle speed is fast, accordingly it is possible to suppress decrease of the power supply voltage in an extremely effective manner.

Furthermore, since the speed of reduction of the upper limit electrical current value is slow if the vehicle speed is high, accordingly it becomes difficult for the driver of the vehicle to experience a sense of discomfort during steering actuation. As a result, it is possible to anticipate a good balance between suppressing decrease of the power supply voltage, and ensuring good steering actuation characteristics.

BRIEF DESCRIPTION OF THE DRAWINGS

The foregoing and further objects, features and advantages of the invention will become apparent from the following description of example embodiments with reference to the accompanying drawings, wherein the same or corresponding portion are denoted by the same reference numerals and wherein.

DETAILED DESCRIPTION OF THE PREFERRED EMBODIMENTS

Figure 1:
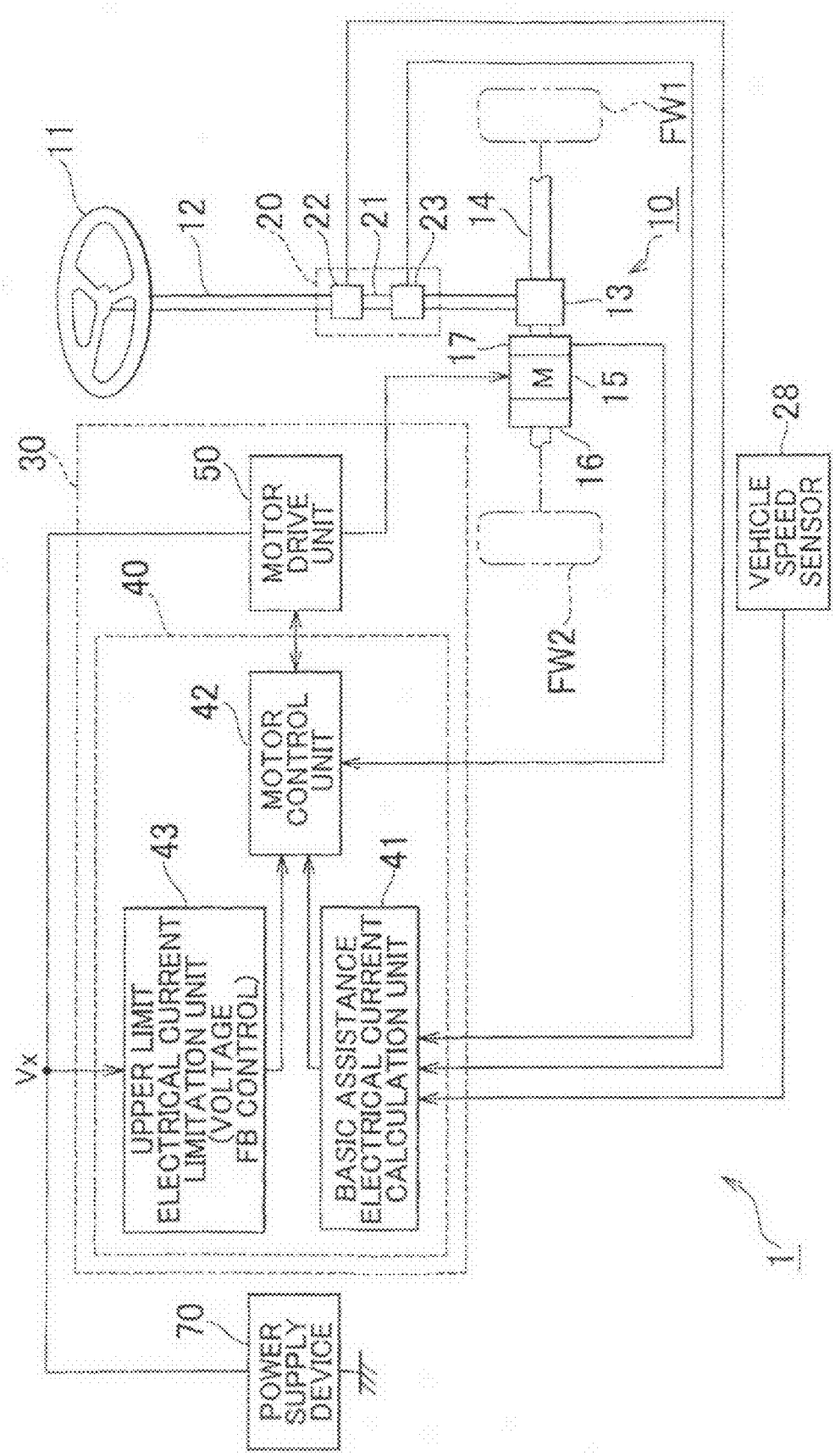
FIG. 1 is an overall structural diagram of an electric power steering device according to an embodiment of the present invention.

In the following, an electric power steering device according to an embodiment of the present invention will be explained with reference to the drawings. FIG. 1 schematically shows the electric power steering device according to this embodiment.

In overall terms, this electric power steering device comprises a steering assistance mechanism 10, which imparts a steering assistance force to the steered wheels of the vehicle, and an assistance control device that drive controls an electric motor 15 comprised in the steering assistance mechanism 10.

Using a rack and pinion mechanism 13, the steering assistance mechanism 10 converts rotation about its axial line of a steering shaft 12 which operates together with the rotational actuation of a steering wheel 11, into linear movement of a rack bar 14 along its axial direction, and the left and right front wheels FW1, FW2 of the vehicle, which are its steered wheels, are steered according to this linear movement of this rack bar 14 along its axial direction. The electric motor 15 is fitted around the rack bar 14. And a steering assistance force is provided according to the rotational actuation of the steering wheel 11, by the rack bar 14 being driven via a ball screw mechanism 16 linearly along its axial direction, according to the rotation of the electric motor 15. A rotational angle sensor 17 is attached to the electric motor 15, and a steering torque sensor 20 is fitted around the lower end portion of the steering shaft 12.

The rotational angle sensor 17 consists of a resolver, and it detects the rotational angle of the electric motor 15 and outputs a detection signal, which specifies this detected rotational angle. The steering torque sensor 20 comprises a torsion bar 21, which is fitted in an intermediate portion of the steering shaft 12 between its upper end and its lower end, and resolvers 22, 23, which are respectively fitted around the upper end portion and the lower end portion of this torsion bar 21. The resolvers 22, 23 respectively detect the rotational angles of the upper end and the lower end of the torsion bar 21, and output respective detection signals, which specify these rotational angles, which they have detected.

The assistance control device 30 corresponds to the "actuator control means" in the Claims of the present specification, and basically comprises an electronic control device 40 which consists of a microcomputer, and a motor drive circuit 50 which drive controls the electric motor 15 with a control signal from the electronic control device 40. Furthermore, this electronic control device 40 comprises a motor control unit 42 which sends a control signal from its functional surface to the electric motor drive circuit, a basic assistance electrical current calculation unit 41 which calculates an amount of electricity to be provided to the electric motor 15, and an upper limit electrical current limitation unit 43 which limits the electrical current which flows to the electric motor 15 according to the power supply voltage of a power supply device 70.

It should be understood that, in the following explanation, the electrical current which flows to the electric motor 15 is termed the "assistance electrical current".

The basic assistance electrical current calculation unit 41 determines the amount of electrical current which flows to the electric motor 15, based upon the detection signals from the steering torque sensor 20 and the speed of the vehicle as detected by a vehicle speed sensor 28.

The upper limit electrical current limitation unit 43 corresponds to the "voltage maintenance control means" of the Claims, and it detects the power supply voltage of the power supply device 70, and, according to a feedback control procedure which will be described hereinafter, by setting an upper limit value for the assistance electrical current, limits the amount of electrical current which flows to the electric motor 15 so that the power supply voltage becomes a set voltage.

The motor control unit 42 is a device which outputs a control signal to the motor drive circuit 50 to flow to the electric motor 15 an assistance electrical current which has been calculated by the basic assistance electrical current calculation unit 41, within the range of the upper limit electrical current value which has been limited by the upper limit electrical current limitation unit 43, and it monitors the state of the electric motor 15 according to the rotational angle sensor 17, and outputs a drive control signal.

Figure 2:
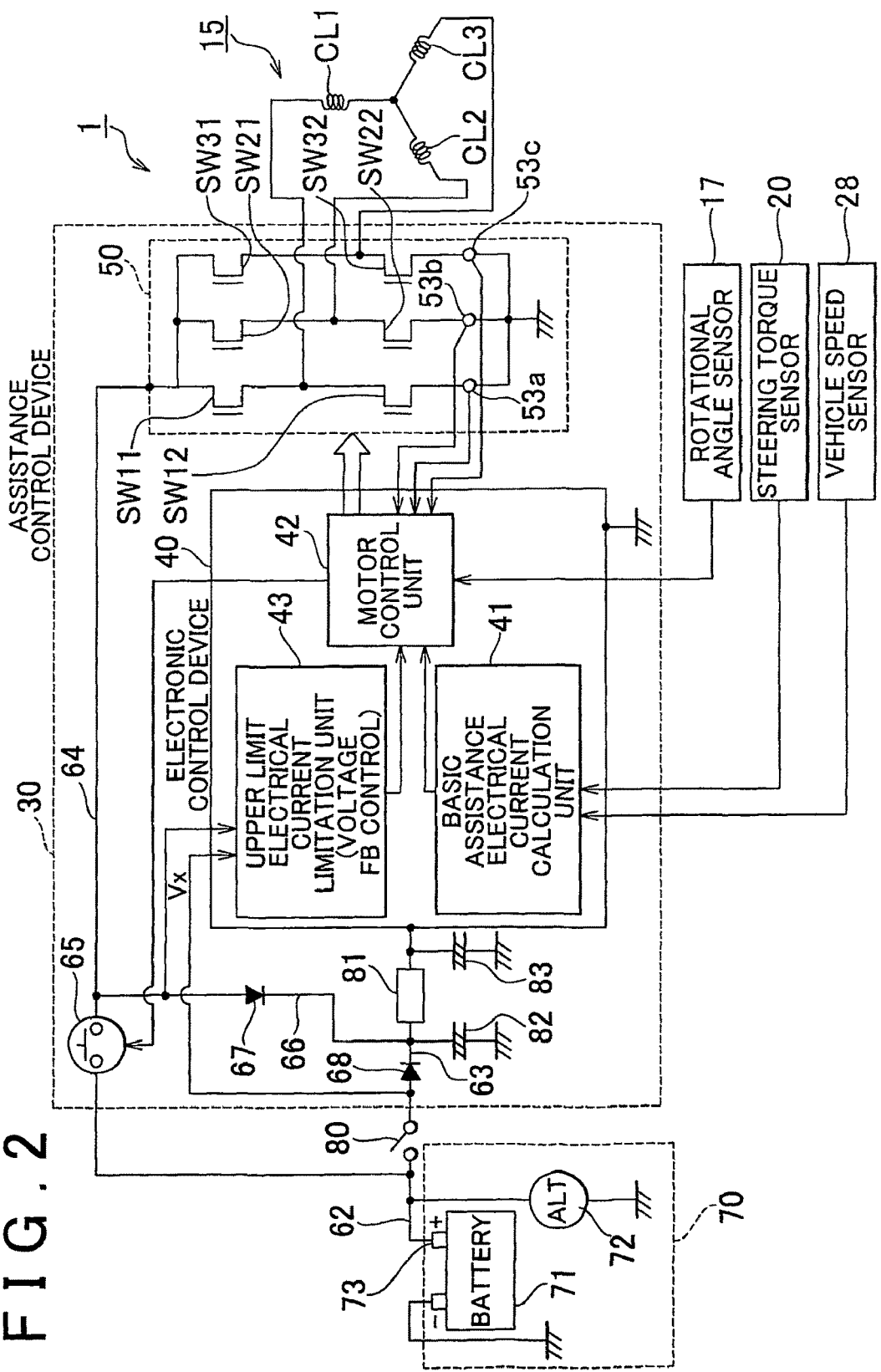
FIG. 2 is a schematic structural circuit diagram of an assistance control device.

The motor drive circuit 50 comprises a three phase inverter circuit, as shown in FIG. 2, and comprises switching elements SW11, SW12, SW21, SW22, SW31, and SW32 which respectively correspond in pairs to three coils CL1, CL2, CL3 of the electric motor 15 (in this embodiment, a three phase brushless motor is used). These switching elements SW11, SW12, SW21, SW22, SW31, and SW32 are ON/OFF controlled by signals from the motor control unit 42. Furthermore, electrical current sensors 53*a*, 53*b*, and 53*c* are provided to the motor drive circuit 50, and these detect the values of the electrical currents flowing in the electric motor 15 for each phase. In the following, these three electrical current sensors 53*a*, 53*b*, and 53*c* will collectively be termed the electrical current sensor 53.

Next, the structure of the power supply system for this electrical power steering device 1 will be explained with reference to FIG. 2.

The power supply device 70, which is the power supply to the electric power steering device 1, comprises a battery 71 and an alternator 72, which is a generator. In this embodiment, a standard battery rated at 12V is used.

A power supply source line 62 which is connected to the power supply terminal (the + terminal) of this battery 71 is connected to an ignition switch 80, and a control power supply line 63 which supplies power to the electronic control device 40 is branched off from the secondary side of this ignition switch 80, while a drive power supply line 64 which supplies power to the motor drive 50 is branched off from the primary side (the power supply side) of the ignition switch 80.

Along with a power supply relay 65 being provided in the drive power supply line 64, a link line 66 is provided in the load side of this power supply relay 65 and connects to the control power supply line 63. A diode 67 is provided in this link line 66 as a reverse current flow prevention element, to prevent back flow of electrical current from the control power supply line 63 to the drive power supply line 64.

Furthermore, in the control power supply line 63, more to the power supply side than the connection point with the link line 66, there is provided a diode 68 as a reverse current flow prevention element, to prevent back flow of electrical current to the power supply side.

The control power supply line 63 is used for power supply to the electronic control device 40, and moreover the drive power supply line 64 is used as a power supply path to the motor drive circuit 50 and the electronic control device 40.

The power supply relay 65, which is provided in the drive power supply line 64, is opened and closed by a signal from the electronic control device 40.

Furthermore, voltage detection for the power supply which is supplied to the electric power steering device 1 is performed at two spots: the voltage on the drive power supply line 64 side, and the voltage on the control power supply line 63 side. In concrete terms, the voltage on the primary side of the diode 67 and the voltage on the primary side of the diode 68 are both monitored by the upper limit power supply limitation unit 43, and the one of these two monitored voltages which is the lower is viewed as the detected power supply voltage Vx.

A regulator 81 is provided to the power supply input unit of the electronic control device 40, and converts the power supply voltage (12V) to 5V, which is its drive voltage. Furthermore, respective smoothing condensers 82, 83 are provided to the primary side and the secondary side of this regulator 81, with the intention of stabilizing the power supply voltage. These smoothing condensers 82, 83 are capable, when the supply of electrical power from the power supply device 70 has been interrupted, of supplying power to the electronic control device 40 for a predetermined short time period only, due to the electric charge accumulated in their interiors, and they correspond to the "power supply maintenance means" of the Claims of the present specification.

Figure 3:
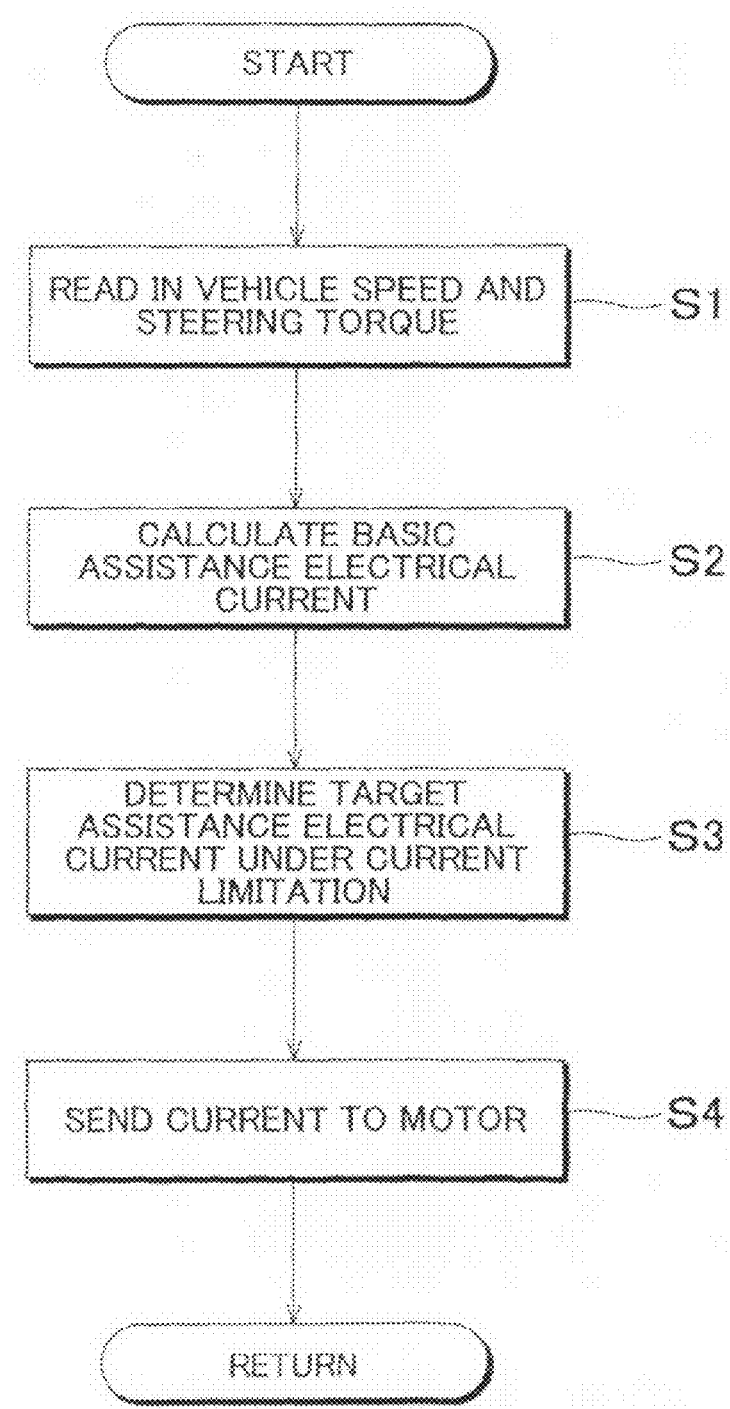
FIG. 3 is a flow chart showing an assistance control routine.

Next, the assistance control procedure that is performed by the electronic control device 40 will be explained. FIG. 3 is a figure showing this assistance control routine, which is stored as a control program in a ROM of the electronic control device 40, and is repeatedly executed upon a short cycle. A summary of the control by this assistance control routine of the electrical power supply to the electric motor 15 to generate a predetermined steering assistance torque will now be given; its processing related to the limitation of electrical current, which constitutes the special characteristic of the present invention, will be described hereinafter.

When this control routine is started by the ignition switch 80 being turned ON, first, in a step S1, the vehicle speed V which has been detected by the vehicle speed sensor 28, and the steering torque TR which has been calculated from the difference of the rotational angles which have been detected by the resolvers 22, 23 of the steering torque sensor 20, are read in.

Figure 4:
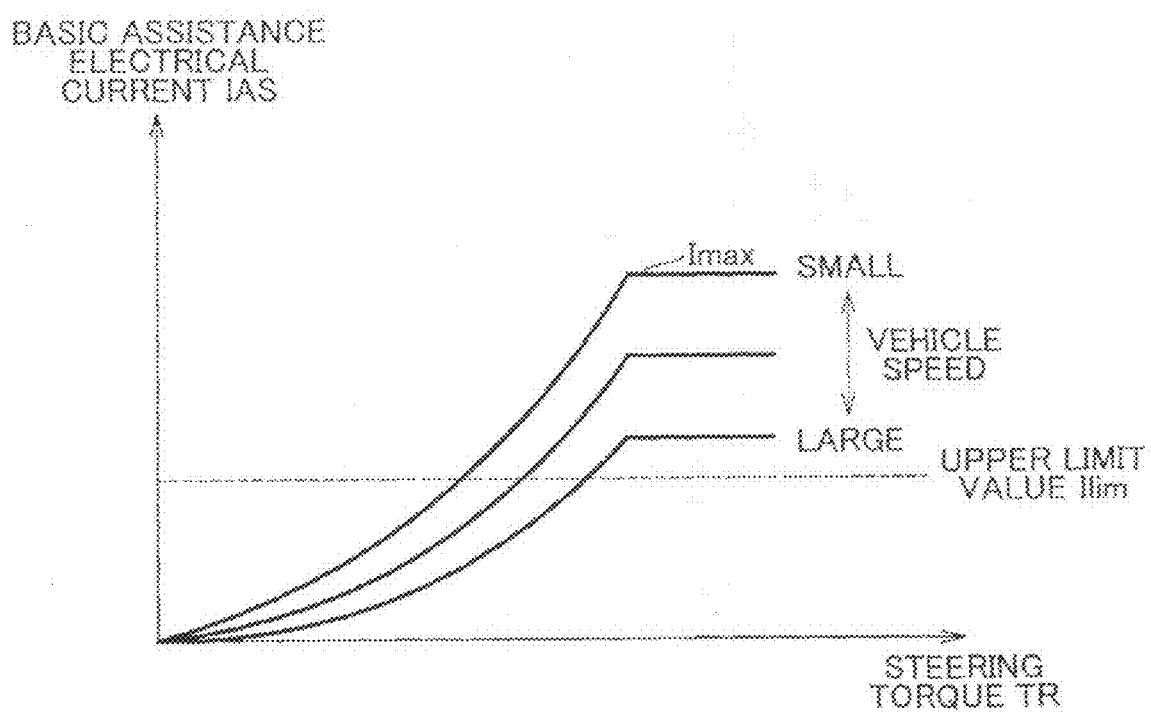
FIG. 4 is an explanatory figure showing a diagram for calculating an assistance electrical current.

Next, a basic assistance electrical current Ias which is set according to the vehicle speed V and the steering torque TR is calculated (in a step S2) by referring to the assistance electrical current diagram shown in FIG. 4. This assistance electrical current diagram is stored in the ROM of the electronic control device 40, and the basic assistance electrical current Ias is set, according to increase of the steering torque TR, to increase as well, and moreover to attain a larger value as the vehicle speed V becomes lower. By the basic assistance electrical current Ias is meant an amount of electrical current flowing to the electric motor 15 that is needed to provide a target assistance torque determined according to the vehicle speed and the steering torque.

However, if the state of the power supply device 70 is bad, for example if the remaining capacity of the battery 70 decreases or the like, then, if the basic assistance electrical current Ias which has been calculated is supplied just as it is to the electric motor 15, the power supply voltage undesirably decreases greatly, and it becomes impossible for the performance of the electric motor 15 to be provided satisfactorily. Furthermore, if the power supply voltage decreases greatly and drops below the minimum drive voltage for the electronic control device 40, then the electronic control device 40 is reset, and the steering assistance function is interrupted, which is undesirable.

Thus, in the next step S3, a target assistance electrical current is determined by imposing an upper limit electrical current upon the basic assistance electrical current Ias by power supply voltage feedback control, as will be described hereinafter.

Next, the duty ratios of the switching elements SW11, SW12, SW21, SW22, SW31, and SW32 of the motor drive circuit 50 are adjusted (in a step S4) while monitoring the amount of electrical current which flows via an electrical current sensor 53, in order for this target assistance electrical current which has thus been determined to flow to the electric motor 15.

By doing this, the predetermined assistance electrical current according to the state of the power supply device 70 flows to the electric motor 15, so that the steering assistance torque is generated.

It should be understood that, if the power supply voltage is not decreased, then the electric motor 15 is drive controlled (normal control as will be described hereinafter) by making the basic assistance electrical current Ias which has been obtained by the step S2 be the target assistance electrical current; while, if the power supply voltage is decreased, then the electric motor 15 is drive controlled by imposing an upper limit electrical current limit upon the basic assistance electrical current Ias in the step S3 (voltage feedback control or suppression return control, as will be described hereinafter).

Next, the processing by the upper limit electrical current limitation unit 43 for limiting the upper limit electrical current of the electric motor 15 upon decrease of the power supply voltage will be explained.

Figure 5:
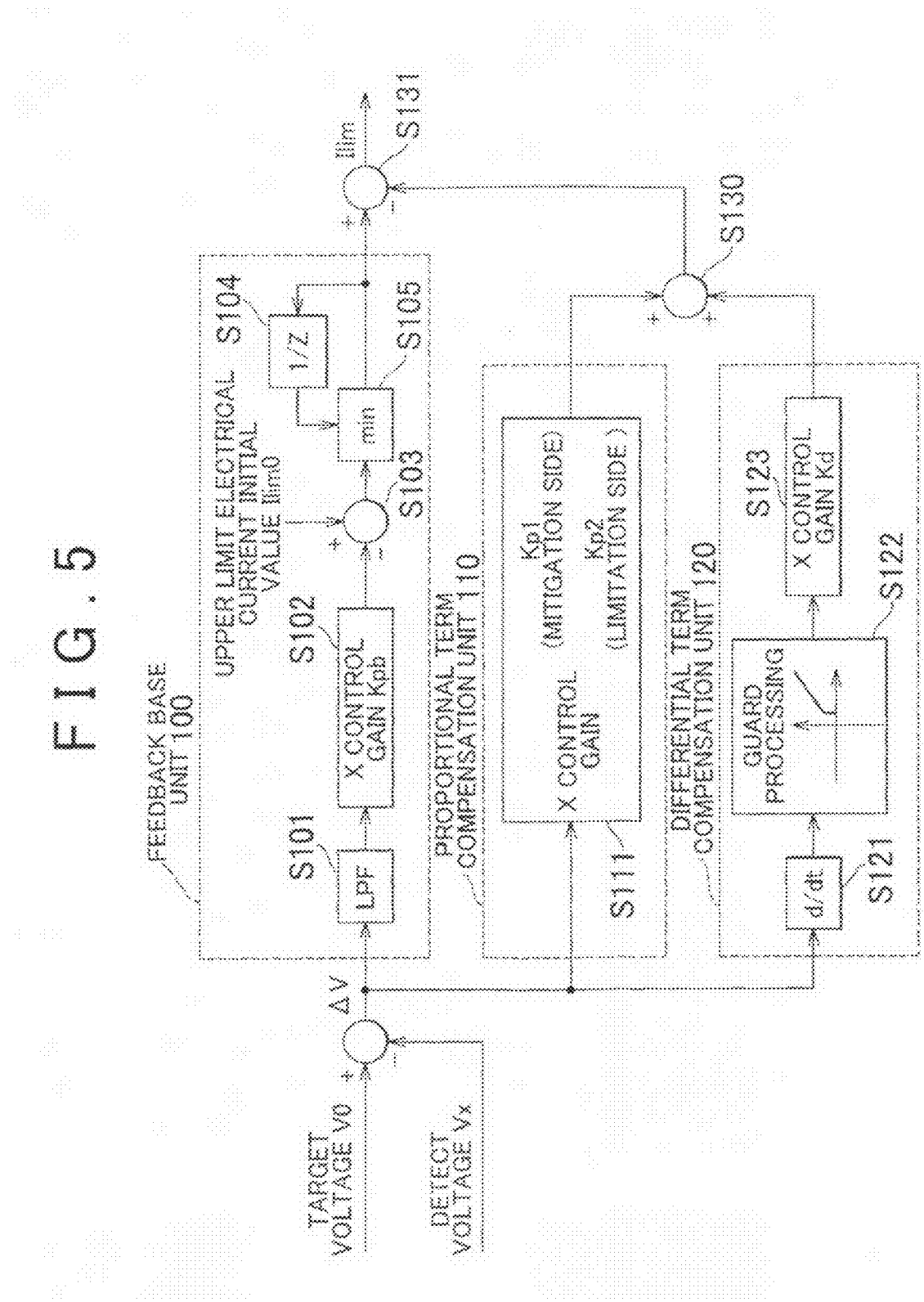
FIG. 5 is a block diagram illustrating voltage feedback control.

FIG. 5 is a control block diagram showing feedback control by adjustment of the upper limit electrical current value of the electric motor 15, so that the supply voltage attains a target voltage. In the following, this control will be termed voltage feedback control.

The upper limit electrical current limitation unit 43 always detects the power supply voltage of the power supply which is supplied from the power supply device 70 to the electric power steering device 1, and obtains the deviation $\Delta V$ between this detected voltage Vx and a target voltage V0 (in this embodiment, 10 V). It should be understood that this target voltage V0 is set to a voltage that ensures the proper operation of the electric power steering device 1.

Moreover, this upper limit electrical current limitation unit 43 comprises a feedback base unit 100 which determines a basic upper limit electrical current value based upon this deviation $\Delta V$ and an upper limit electrical current initial value Ilim0, a proportional term compensation unit 110 which calculates a proportional compensation amount for the deviation $\Delta V$, and a differential term compensation unit 120 which calculates a differential compensation amount for the deviation $\Delta V$; and it also comprises a PD control arithmetic logical circuit which subtracts the compensation amounts which have been calculated by the proportional term compensation unit 110 and by the differential term compensation unit 120 from the basic upper limit electrical current value which has been calculated by the feedback base unit 100.

The feedback base unit 100 selects and sets, as the initial value Ilim0 of the upper limit electrical current for the electric motor 15, whichever has the lower value of the electrical current value which flows to the electric motor 15 when the voltage feedback control has been started, and a value (Imax/2) half of the maximum value of the basic assistance electrical current (the maximum electrical current value Imax shown in FIG. 4: for example, 60 A). Although the timing of the start of voltage feedback control will be described hereinafter, it should be understood that it occurs when the detected voltage Vx of the power supply voltage drops below a predetermined voltage V1 (for example, 11 V).

And proportional compensation for this upper limit electrical current initial value Ilim0 is implemented according to the deviation $\Delta V$. In this embodiment, the minute voltage fluctuation amounts in the deviation $\Delta V$, which constitute noise therein, are eliminated with a low pass filter (S101), a value which is obtained by multiplying this deviation $\Delta V$ with noise eliminated by a proportional gain Kpb is set as the electrical current compensation value (S102), and this electrical current compensation value is subtracted from the upper limit electrical current initial value Ilim0.

Moreover, a value which is the lesser of the value which has been obtained by subtracting the electrical current compensation value from the upper limit electrical current initial value Ilim0, and the value which has been calculated in the same manner the previous time around (S104), is outputted (S105) as the basic upper limit electrical current value which has been calculated by the feedback base unit 100.

As for the setting of this proportional gain Kpb, it is set to a value such that the upper limit electrical current value Ilim becomes 0(A), when the power supply voltage has decreased as far as a predetermined voltage. This predetermined voltage is set to a value which is greater than the lowest drive voltage for the electronic control device 40, and when, from the state in which the power supply voltage has fallen below this predetermined voltage, it has recovered and again exceeded the predetermined voltage, then it is arranged for the assistance electrical current to be supplied immediately. Accordingly, even though the steering assistance function is temporarily stopped upon decrease of the power supply voltage, when the power supply voltage has returned, it is possible to revive the steering assistance function just as it was, without any necessity for restarting the electronic control device 40. Furthermore, it is possible to prevent the occurrence of so-called kickback of the steering wheel 11 when the steering assistance function is suddenly suspended, since the assistance electrical current decreases according to decrease of the power supply voltage.

The power supply device 70 is not only connected to the electric power steering device 1, but to other electric control systems, and operational noise of the actuators of these various systems is superimposed upon the power supply line. Thus, in this embodiment, noise outside the region required for preventing power supply voltage decrease is eliminated. In this case, the cutoff frequency of the low pass filter is set to greater than or equal to the frequency of the voltage fluctuations which occur in practice.

It should be understood that, in this voltage feedback control, the value obtained by multiplying the proportional gain $Kpb$ by the deviation $\Delta V$ comes to indicate the voltage, but, here, the electric current compensation value is set from this value, according to its magnitude. The point that the electric current compensation value is set from a voltage obtained in this manner, is the same in the processing by the proportional term compensation unit 110 and the differential term compensation unit 120, as described hereinafter.

The proportional term compensation unit 110 calculates (S111), as the electrical current compensation value, a value that is obtained by multiplying the deviation $\Delta V$ between the target voltage $V0$ and the detected voltage $Vx$ by a proportional gain $Kp1$ or a proportional gain $Kp2$ ($>Kp1$). In this case, if on the side of relaxing the electrical current limitation, in other words if the detected voltage $Vx$ is higher than the target voltage $V0$ so that the deviation $\Delta V$ has a negative value, then the proportional gain $Kp1$ is employed; while, on the other hand, if on the side of strengthening the electrical current limitation, in other words if the detected voltage $Vx$ is lower than the target voltage $V0$ so that the deviation $\Delta V$ has a positive value, then the proportional gain $Kp2$ is employed.

Since the proportional gain $Kp2$ is set to a value which is larger (for example several times greater) than the proportional gain $Kp1$, accordingly the compensation amount to the side of lowering the upper limit electrical current value Ilim (the side of strengthening the electrical current limitation) is set to be greater than the compensation amount to the side of increasing the upper limit electrical current value Ilim (the side of relaxing the electrical current limitation).

The differential term compensation unit 120, along with differentiating the deviation $\Delta V$ between the target voltage $V0$ and the detected voltage $Vx$ (S121), also implements guard processing upon this differentiated value (S122), and moreover calculates a value which is obtained by multiplying it by a differential gain $Kd$ as an electrical compensation value (S123). In this guard processing, only differentiated values that are greater than or equal to a predetermined value, and which moreover occur on the side where the change of voltage decreases, are objects of electrical current compensation. And a value, which is obtained by multiplying the amount of control that has been guard processed by the differential gain $Kd$, is outputted as the electrical current compensation amount.

After doing this, the electrical current compensation values that have been calculated by the proportional term compensation unit 110 and by the differential term compensation unit 120 are added together (S130). And this electrical current compensation value total which has been calculated by the proportional term compensation unit 110 and the differential term compensation unit 120 is subtracted (S131) from the basic upper limit electrical current value which has been calculated by the feedback base unit 100, and the result of this calculation becomes the final upper limit electrical current value Ilim.

In this voltage feedback control, along with the upper limit electrical current value, which is to become standard being set by the feedback base unit 100, the change of the actual voltage (the detected voltage $Vx$), which has been made slowly, is determined, and the center of the actual voltage is shifted to the side higher than the target voltage $V0$.

In the setting of the upper limit electrical current value, the value on the smaller side of the actual electrical current when the voltage feedback control started or the maximum electrical current value Imax/2 is selected and set as this initial value.

The voltage feedback control is started, as described above, when the power supply voltage drops below the reference voltage, but, by setting the upper limit electrical current initial value Ilim which limits the assistance electrical current to the electrical current value (the assistance electrical current value) actually flowing to the electric motor 15 at this time, it is possible quickly to prevent decrease of the power supply voltage. In other words, the maximum electrical current value Imax is determined as shown in the diagram of FIG. 4, and the assistance electrical current is supplied to the electric motor 15 within the range thereof; but, when decrease of the power supply voltage has been detected, the load is already in an excessive state with regard to the power supply capability of the power supply device 70, and accordingly, when the upper limit electrical current value is reduced from this maximum electrical current value Imax, it takes a certain time period until the electric power limitation becomes effective.

Thus, delay of the electrical power limitation is prevented by setting the upper limit electrical current initial value Ilim0 to the actual electrical current when voltage feedback control is initiated. Furthermore, if this actual electrical current value is large and is greater than or equal to ½ of the maximum electrical current value, then Imax/2 is set to the upper limit electrical current initial value Ilim0, and thus delay of the electrical power limitation is prevented.

Furthermore, since the steering assistance force is immediately decreased due to the initiation of the voltage feedback control, accordingly the beneficial effect is obtained that it is easy for the driver to recognize that the assistance force reduction state has been established.

The target voltage $V0$ is maintained by the proportional term compensation unit 110 rapidly making the change of the actual voltage be reflected in the control value. In this case, in order to reliably prevent decrease of the power supply voltage, the control gain for the upper limit electrical current on the regulation side (the decrease side) is set to be larger than on the relaxation side (the increase side), so that the responsiveness is thereby adjusted.

Furthermore, hunting of the power supply voltage due to this adjustment of the control responsiveness is prevented. In other words, while the upper limit electrical current value is relaxed (i.e. is increased) when the power supply voltage has been restored by limitation of the upper limit electrical current, if this is performed with the same responsiveness for the upper limit electrical current on the relaxation adjustment side and on the regulation side, hunting, in which a voltage decrease is again generated, may occur, which is undesirable. Thus by, along with preventing hunting of the voltage by slowing down the control responsiveness on the side of relaxing the upper limit electrical current, also speeding up the control responsiveness on the side of regulating the upper limit electrical current, it is possible to reliably prevent decrease of the power supply voltage.

Furthermore it is possible, with the differential term compensation unit 120, to prevent abrupt decrease of the power supply, since, if a change of voltage is generated on the decrease side, and only if the differential value becomes greater than or equal to a predetermined value, then the compensation amount for the upper limit electrical current value is calculated by multiplying the control gain by the differentiated value. In this case, in the differential term compensation unit 120 as well, the values of the control gain are made to be different on the side of relaxing, and on the side of regulating, the upper limit current electrical value.

Furthermore, while the above described feedback control of the power supply voltage which is performed by the upper limit electrical current limitation unit 43 is repeated at a predetermined cycle, resetting of the electronic control device 40 by decrease of the power supply voltage is prevented by setting this control cycle to be shorter than or equal to the momentary endurance of the electronic control device 40.

In other words, although the electronic control device 40 would be reset when the power supply voltage drops below its minimum drive voltage, which would be undesirable, it is not reset during a predetermined short time period, due to the fact that electrical power has been accumulated in the smoothing condensers 82, 83 which are provided to the power supply unit.

Thus, by setting the responsiveness (the control cycle) of the feedback control of the power supply voltage to be a shorter cycle than the time period from when the power supply voltage drops below the minimum voltage until the electronic control device 40 is reset, resetting of the electronic control device 40 is prevented by avoiding voltage decrease before the power supply voltage is reset, although it may have decreased.

Generally, with an electric power steering device according to the prior art, if the power supply voltage drops below the minimum drive voltage and a temporary reset has occurred, not only is the steering assistance function stopped, but also a certain time period is required until the system restarts. In other words, for a restart, it is necessary for the power supply voltage to rise to quite a high value, and also, even though the restart may be commenced, due to the implementation of initial diagnostics and the like, it is not possible to initiate steering assistance control immediately. Furthermore, since the steering assistance force suddenly disappears when a reset is initiated, there is also a possibility that kickback of the steering wheel may occur.

By contrast, according to the electric power steering device 1 of this embodiment, it is possible to avoid resetting of the electronic control device 40, and to suppress faults associated therewith.

Figure 6:
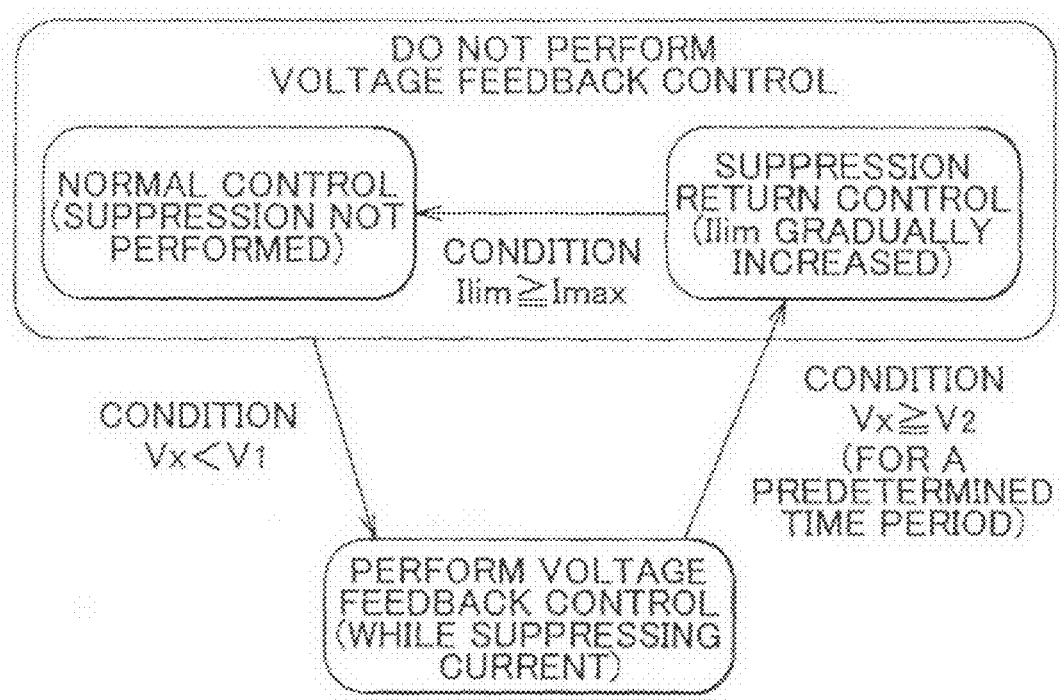
FIG. 6 is an explanatory figure showing assistance control changeover processing.

Next, the changeover of the assistance control that is performed by the electronic control device 40 will be explained with reference to FIG. 6.

If the power supply voltage of the power supply device 70 is in the normal range, then normal assistance control is performed. In other words, along with inputting the vehicle speed signal from the vehicle speed sensor 28 and the steering torque signal from the steering torque sensor 20, the basic assistance electrical current Ias is calculated by referring to the assistance electrical current diagram shown in FIG. 4, and this basic assistance electrical current is supplied to the electric motor 15. By doing this, the optimum steering assistance force is obtained corresponding to the driving conditions.

The upper limit electrical current limitation unit 43 of the electronic control device 40 always monitors the power supply voltage, and, if this detected voltage Vx drops below a first reference voltage V1, it initiates feedback control of the power supply voltage by adjusting the above described upper limit electrical current value Ilim. In other words, regulation of this upper limit for the electrical current value for the basic assistance electrical current Ias which is calculated from the assistance electrical current diagram shown in FIG. 4 is performed, to be able to maintain the power supply voltage at the target voltage V0.

It should be understood that this first reference voltage V1 corresponds to the "feedback control starting voltage" of the Claims of the present specification.

Moreover when, by regulation of the upper limit electrical current value Ilim, the power supply voltage recovers and the detected voltage Vx becomes greater than or equal to a second reference voltage V2 continuously over a predetermined time period, then the system shifts to suppression return control.

This suppression return control is a form of control in which the upper limit electrical current value Ilim is increased gradually, and which is terminated at the stage at which the value thereof has reached the maximum electrical current value Imax, when the system returns to normal assistance control.

It should be understood that this second reference voltage V2 corresponds to the "feedback control ending voltage" of the Claims of the present specification.

Next, the changeover of assistance control will be explained in detail with reference to the flow chart of FIG. 7.

Figure 7:
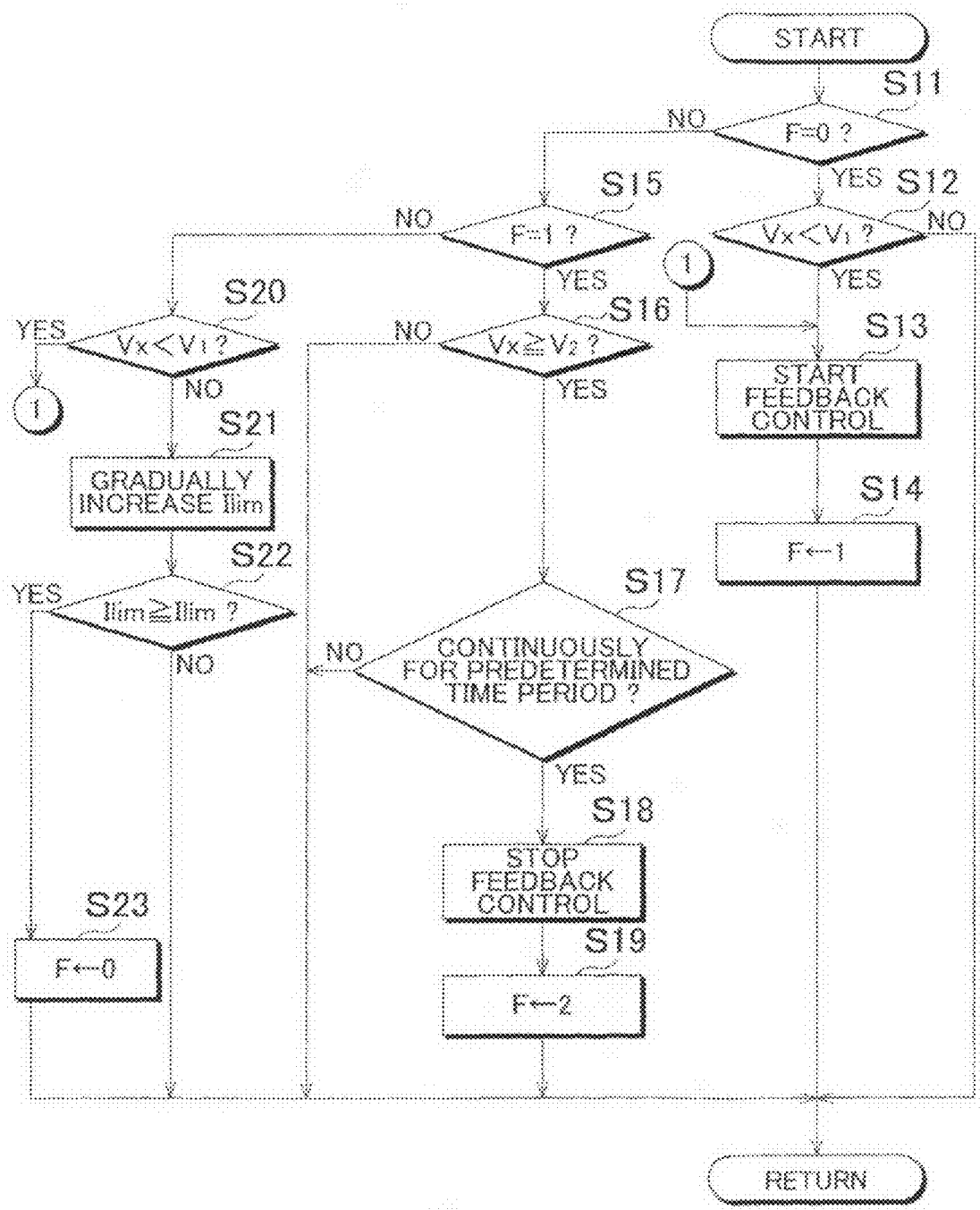
FIG. 7 is a flow chart showing the flow of an assistance control changeover routine.

FIG. 7 shows the assistance control changeover routine that is executed by the electronic control device 40; this is stored as a control program in the ROM of the control device 40.

This assistance control changeover routine is started by the ignition switch 80 being turned ON, and is changed over and executed at a predetermined short cycle.

First, the state of a flag F is determined (in a step S11). This flag F is one which shows the control state at the present time point: during normal control, F=0 is set; during voltage feedback control, F=1 is set; and, during suppression return control, F=2 is set.

When this routine starts, the flag F is set to F=0 (normal control, and accordingly the decision in the step S11 is "YES". Next, the power supply voltage is detected, and a decision is made (in a step S12) as to whether or not the detected voltage Vx is less than a first reference voltage V1. If the detected voltage Vx is greater than or equal to the first reference voltage V1, then this changeover control routine is temporarily exited. In other words, normal control is performed.

Since this routine is executed repeatedly, the same decision is repeated for checking the power supply voltage. And, when normal control is being performed, if the decision in the step S12 is "YES", in other words, if the detected voltage Vx is less than the first reference voltage V1, then the system changes over to voltage feedback control (in a step S13), and the flag F is set to F=1 (in a step S14), and this routine is temporarily exited.

Accordingly, the above described voltage feedback control is initiated. By doing this, the assistance electrical current is adjusted so that the decrease of the power supply voltage is suppressed.

Figure 8:
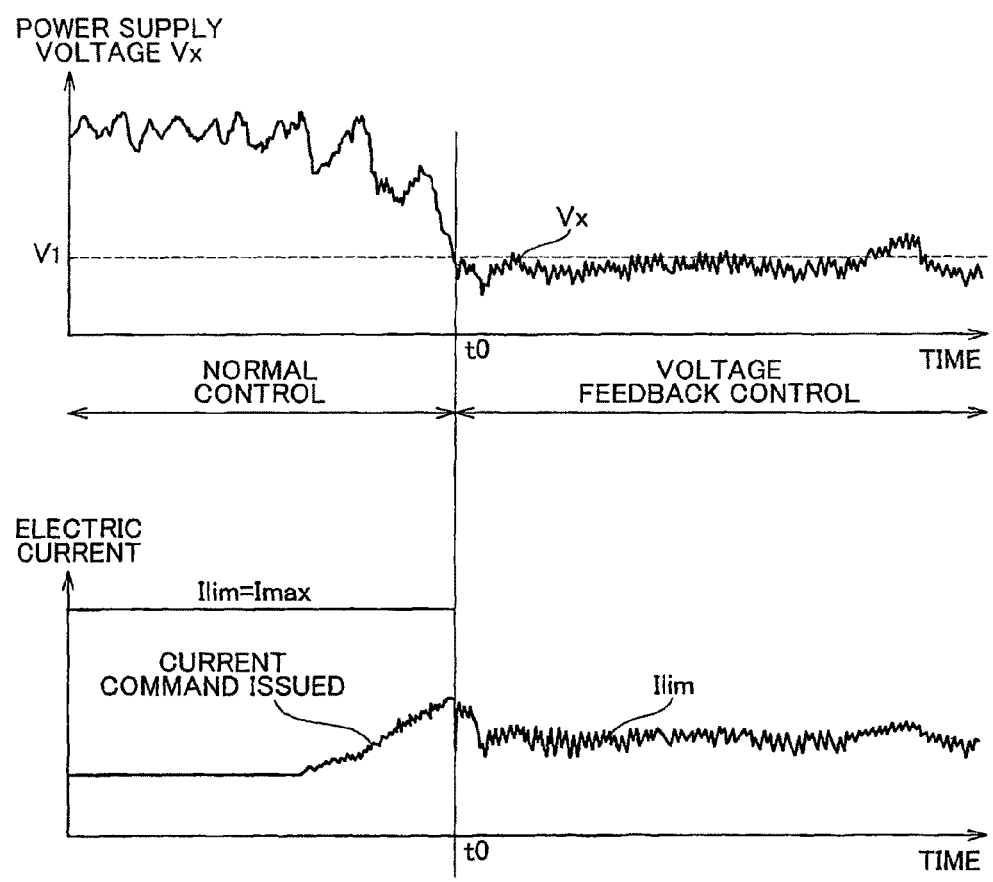
FIG. 8 is a graph illustrating transition of a detected voltage and an upper limit electrical current value.

FIG. 8 shows the transition of the power supply voltage (the detected voltage Vx) and the electrical current value (during normal control the assistance electrical current command value, and during voltage feedback control, the upper limit electrical current value Ilim), when the system has changed over from normal control to voltage feedback control.

As shown in this figure, when the detected voltage Vx first drops below the reference voltage V1 at the time instant to, by initiation of the voltage feedback control, the upper limit electrical current Ilim is limited and decrease of the power supply voltage is suppressed. And the power supply voltage (the detected voltage Vx) is maintained in the neighborhood of the target voltage V0.

When the system shifts in this manner to the voltage feedback control, the result of the decision in the step S11 becomes "NO", and next a decision is made (in a step S15) as to whether or not the flag F is 1. In this case, since the system is performing voltage feedback control, the result of this decision is "YES", and accordingly next a decision is made (in a step S16) as to whether or not the detected voltage Vx is greater than or equal to the second reference voltage V2. This second reference voltage V2 is set to be a higher voltage than the first reference voltage V1. And, while Vx≦V2, the routine is exited without further ado. In other words, the voltage feedback control is continued.

When, by continuing the voltage feedback control, the power supply voltage has been restored by regulating the upper limit value of the assistance electrical current, so that the detected voltage Vx becomes greater than or equal to the second reference voltage V2, then the result of the decision in the step S16 becomes "YES", and next a decision is made (in a step S17) as to whether or not this state (in which Vx≦V2) has continued for a predetermined time period. In other words, a decision is made as to whether this is an instantaneous voltage return which should be ignored, or whether it is a stabilized voltage return. If the condition that Vx≦V2 has been maintained for the predetermined time period (YES in the step S17), then the voltage feedback control is terminated (in a step S18), and the flag F is set to F=2 (in a step S19). Accordingly, the system shifts to suppression return control.

When the system shifts to suppression return control in this manner, since the flag F is set to F=2, the results of the decisions in the steps S11 and S15 are "NO", and the flow of control is transferred to the processing of the step S20. In this step S20, a decision is made as to whether or not the detected voltage Vx has dropped below the first reference voltage V1. Since, directly after the shift to suppression return control, the detected voltage Vx is higher than the first reference voltage V1, accordingly the result of this decision is "NO", and next the upper limit electrical current value Ilim is increased by one step (in a step S21). Next, a decision is made (in a step S22) as to whether or not the upper limit electrical current value Ilim is greater than or equal to the maximum electrical current value Imax. In this suppression return control, the upper limit electrical current value Ilim is increased one step at a time, but the increase amount each time is a small amount, in order to elevate it slowly over a predetermined time period up to the maximum electrical current value Imax.

At the time point at which this suppression return control has been initiated, the decision in the step S22 becomes "NO" and this routine is temporarily exited, and this processing is again repeated. Moreover, when this suppression return control is being performed as well, the checking (in the step S20) of the power supply voltage continues, and if, during this, the detected voltage Vx drops below the first reference voltage V1 (YES in the step S20), then the flow of control proceeds to the processing of the step S13, so that it is possible to anticipate suppression of the decrease of the power supply voltage by change over of the feedback control.

Furthermore, during the suppression return control, if the detected voltage Vx has not dropped below the first reference voltage V1, then at the time point at which the upper limit electrical current value Ilim reaches the maximum electrical current value Imax (YES in the step S22), the suppression return control is terminated and the system returns to the normal control, and the flag F is set to F=0 (in a step S23) and the same processing is repeated.

Figure 9:
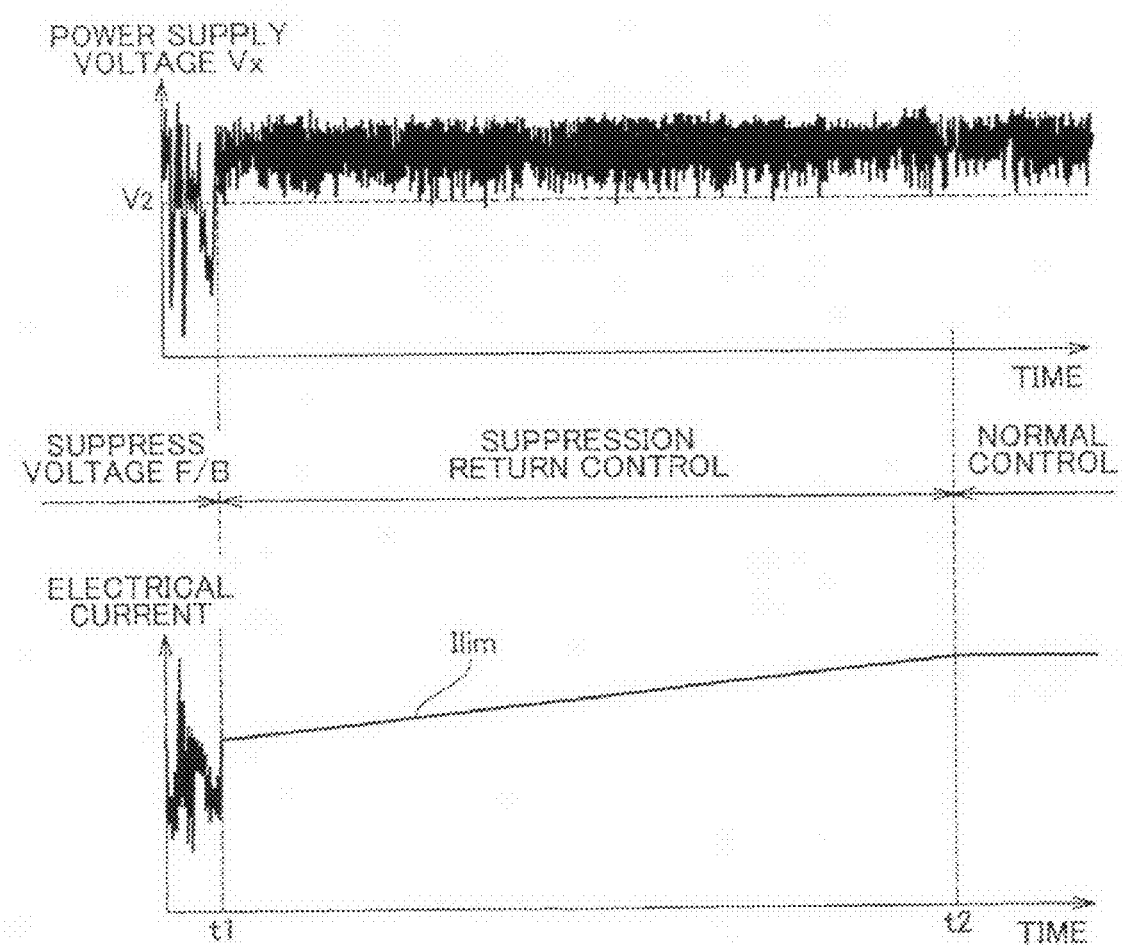
FIG. 9 is another graph illustrating transition of the detected voltage and the upper limit electrical current value.

FIG. 9 shows the power supply voltage Vx and the upper limit electrical current value Ilim when this control changeover has occurred: at the time instant t1 the system switches over from voltage feedback control to suppression return control, and at the time instant t2 the upper limit electrical current value Ilim reaches the maximum electrical current value Imax and the system returns to the normal control.

Since, with the electric power steering system of this embodiment as explained above, when the power supply voltage has decreased, the upper limit electrical current value Ilim which can be supplied to the electric motor 15 is adjusted and feedback control is performed to bring the power supply voltage itself to be equal to the target voltage V0, accordingly, along with strongly suppressing the decrease of the power supply voltage, it is also possible to utilize the electrical power to the maximum limit, according to the state of the power supply. As a result, along with it being possible to drive the electric motor 15 at high voltage and to obtain the anticipated motor performance, it is also possible to prevent resetting of the electronic control device 40, and thus to prevent the inconvenience of the steering assistance function stopping.

Furthermore, since the upper limit electrical current value Ilim is controlled based upon the deviation between the power supply voltage Vx and the target voltage V0, accordingly, for a large decrease of the power supply voltage, the upper limit electrical current value Ilim is set to be low, so that quick decrease of the power supply voltage is suppressed, and, provided that the amount of decrease of the power supply voltage with respect to the target voltage V0 is not small, it is possible to ensure a large assistance steering force by relaxing the limitation of the upper limit electrical current value Ilim.

Moreover since the control gain which determines the compensation amount for the upper limit electrical current value Ilim is set to be large, when this control gain is being controlled on the side of regulating the upper limit electrical current value Ilim (the reduction side), then it is possible to prevent the inconvenience of the steering assistance function stopping due to abrupt decrease of the power supply voltage, as in the prior art; and since, conversely, this control gain is set to be small when the power supply voltage is rising and control is being performed on the side of increasing the upper limit electrical current value Ilim, accordingly it is possible to prevent hunting of the power supply voltage by elevating the upper limit electrical current value Ilim in a gradual manner.

Furthermore since, if the power supply voltage is greater than or equal to a predetermined level (the reference voltage V1), then the voltage feedback control is not performed, but rather normal assistance control is performed, accordingly it never happens that the amount of electrical current which flows to the electric motor 15 is limited inadvertently, which would be undesirable, and thus it is possible to obtain the necessary steering assistance force in a stable manner.

Yet further, since the responsiveness of the feedback control is shorter than the voltage decrease time period which would cause resetting of the electronic control device 40, accordingly it is possible to prevent such resetting of the electronic control device 40, and it is possible to present the inconvenience of the steering assistance function being interrupted, and of it being necessary to wait for a long time period for it to be restarted.

Even further since, when ending the voltage feedback control, the upper limit electrical current value Ilim is not abruptly returned to the maximum electrical current value Imax, but rather the upper limit electrical current value Ilim is gradually increased due to the suppression return control, accordingly it is possible to suppress abrupt elevation of the amount of electrical current which flows to the electric motor 15, and it is possible to prevent hunting of the power supply voltage.

Next, variants of this first embodiment will be explained.

Variant Embodiment 1

Figure 10:
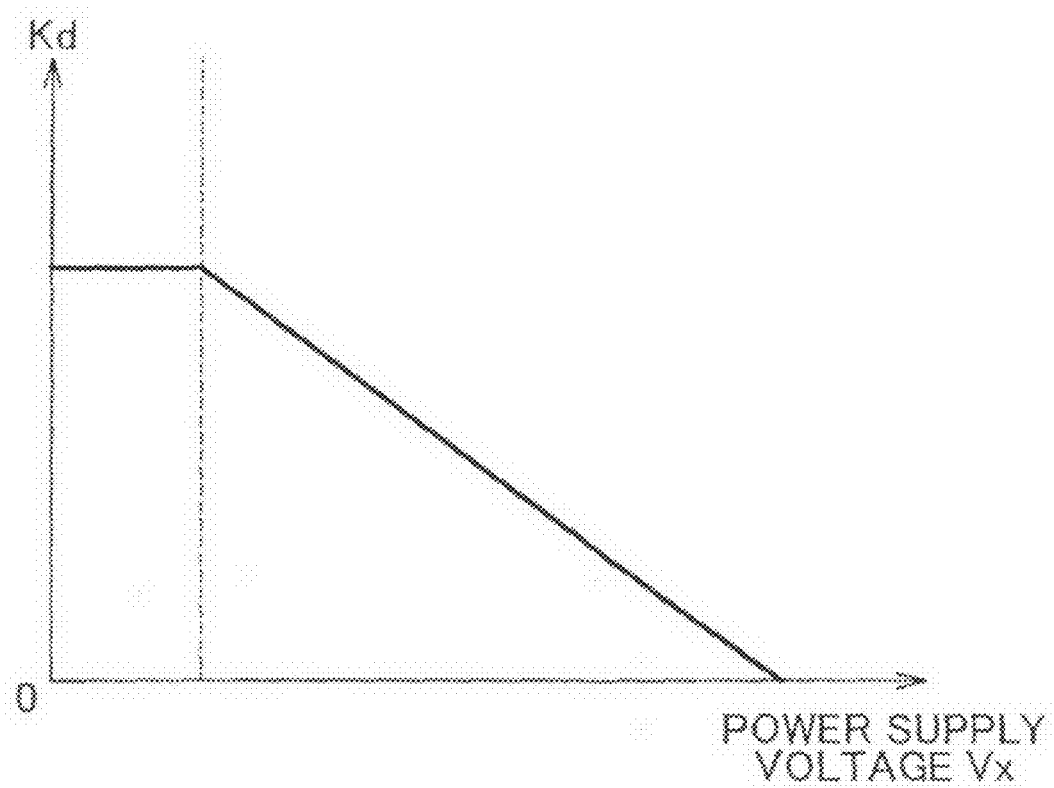
FIG. 10 is an explanatory figure showing a setting diagram for control gain, in a variant embodiment.

In the voltage feedback control of the first embodiment, the differential term compensation unit 120 uses a constant differential gain Kd, but, as shown in FIG. 10, it would also be acceptable to arrange to make it be variable according to the power supply voltage (the detected voltage Vx). In other words, the higher is the power supply voltage, the smaller the value of the differential gain Kd is made to be, so that it is possible to eliminate excessive steering assistance limitation; and, conversely, it would also be acceptable to arrange for decrease of the power supply voltage to be reliably prevented, by making the value of the differential gain Kd the higher, the lower is the power supply voltage.

Moreover, this concept is not limited to the differential gain Kd; it would also be acceptable also to arrange for it to be possible to change the proportional gain according to the power supply voltage (for example, to set it to a value which is the smaller, the higher is the power supply voltage).

Variant Embodiment 2

Figure 13:
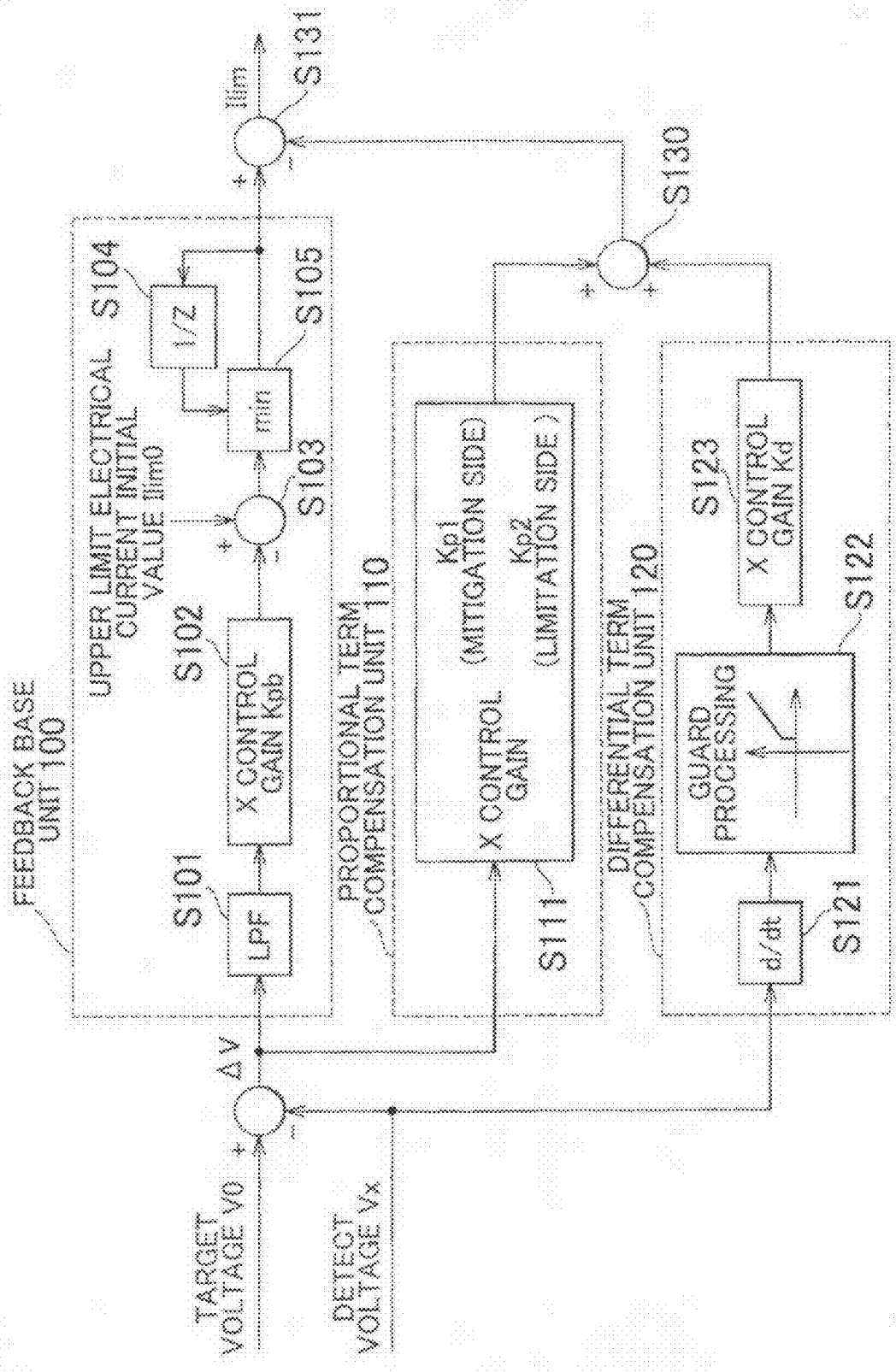
FIG. 13 is a block diagram illustrating voltage feedback control in a variant embodiment.

Although, in the voltage feedback control of the first embodiment, the differential term compensation unit 120 performed differentiation processing upon the deviation ΔV between the target voltage V0 and the detected voltage Vx, as shown in FIG. 13, it would also be acceptable to arrange for the differential compensation amount to be calculated by using the detected voltage Vx itself.

Variant Embodiment 3

In the assistance control changeover processing of the first embodiment, the voltage feedback control was not initiated if the voltage was not below a first reference voltage V1, but, in relation to the compensation processing of the upper limit electrical current value by the proportional element (for example, feedback control by the feedback base unit 100 and the proportional term compensation unit 110), it would also be acceptable to arrange for it to be initiated from a stage in which the power supply voltage is high.

For example, it may be arranged to perform the compensation processing for the upper limit electrical current value by the proportional element at all times, without detecting any decrease of power supply voltage, and to initiate the compensation processing of the upper limit electrical current value by the differential element (the processing by the differential term compensation unit 120) at a stage at which the power supply voltage has dropped below a predetermined voltage.

Since, when the voltage feedback is being performed, the limitation of the upper limit value of the assistance electrical current is initiated after deciding that the voltage has actually decreased, accordingly, if an abrupt decrease of the power supply voltage has occurred, there is a fear that the voltage may decrease instantaneously during the time interval until the electrical current limitation is initiated, which would be undesirable. Assuming this type of case, although feedback control may be performed at all times, in this case, it may happen that the differentiation element operates more than necessary upon fluctuations of the power supply voltage, so that it drops excessively below the upper limit electrical current value, which is undesirable; and as a result it may become impossible to obtain a sufficient steering assistance force.

Thus, in this third variant embodiment, if the power supply voltage is higher than a predetermined voltage, it is arranged to perform feedback control, not based upon the differentiation element, but based upon the proportional element, so that it is possible to anticipate compatibility between suppression of decrease of the actual power supply voltage, and ensuring sufficient steering assistance force.

Furthermore, if the power supply voltage value which constitutes the initiation condition for compensation processing by the differentiation element is set, in consideration of the control responsiveness, only just that much higher than the target voltage V0, this would be desirable, since the beneficial effect of suppression of the voltage decrease would become great.

Variant Embodiment 4

In the voltage feedback control of the first embodiment, filter processing is performed upon the deviation ΔV between the target voltage V0 and the detected voltage Vx, but it would also be acceptable to perform the same filter processing upon the detected voltage Vx.

Next, an electric power steering device 1 according to a second embodiment will be explained. In this electric power steering device of the second embodiment, the assistance control procedure that is implemented by the electronic control device 40 is different, but the structure of the other hardware is the same.

In the following, the assistance control procedure that is executed by the electronic control device 40 will be explained.

Figure 11:
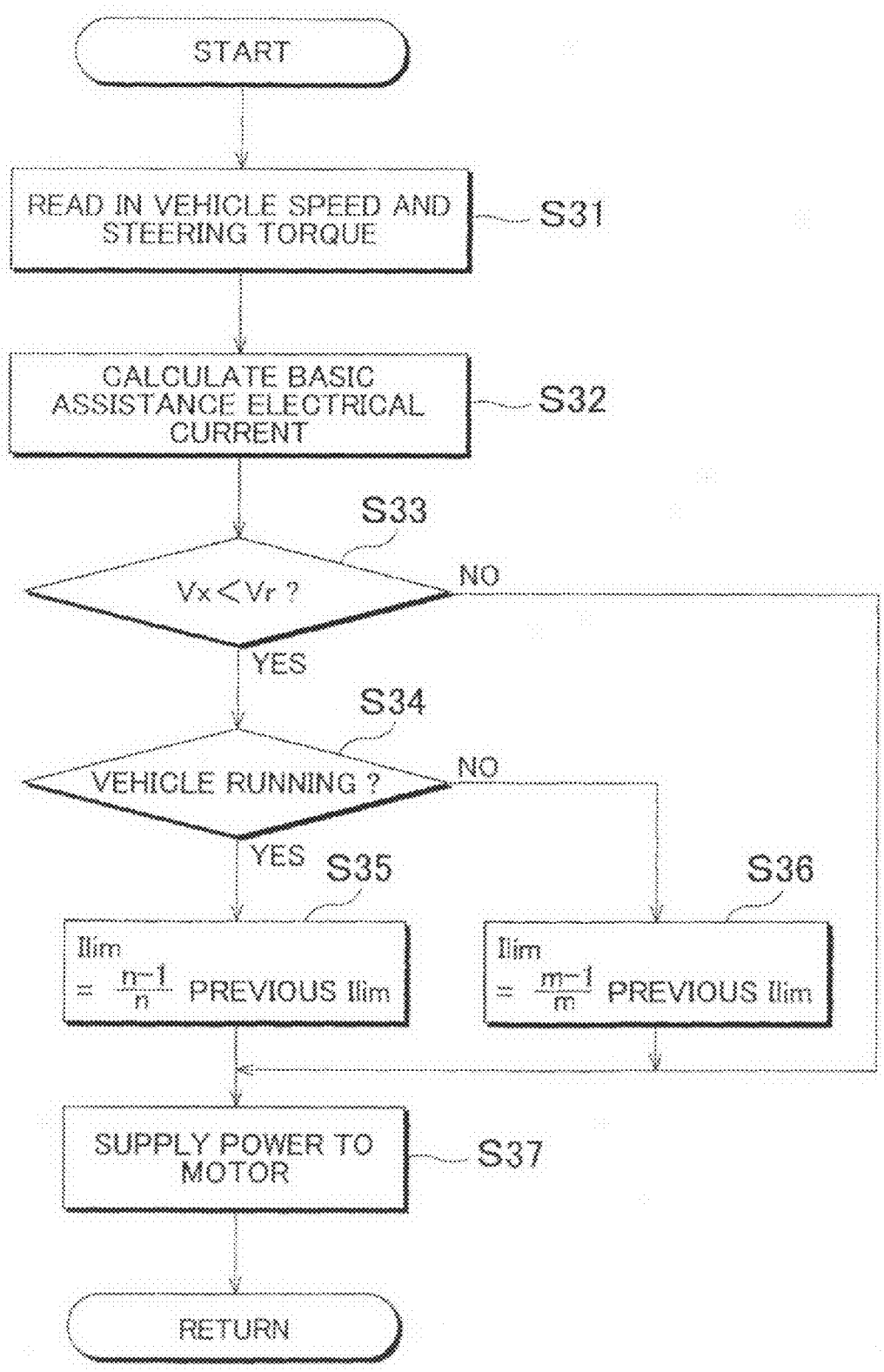
FIG. 11 is a flow chart showing the flow of control of an assistance control routine in a second embodiment.

FIG. 11 shows the assistance control routine in this second embodiment; it is stored as a control program within the ROM of the electronic control device 40, and is repeatedly executed upon a short cycle.

When this control routine is started by the ignition switch 80 being turned ON, first, in a step S31, the vehicle speed V which has been detected by the vehicle speed sensor 28 and the steering torque TR which has been calculated from the difference between the rotational angles detected by the resolvers 22, 23 of the steering torque sensor 20 are read in.

Next, the basic assistance electrical current Ias which is set according to the vehicle speed V and the steering torque TR is calculated (in a step S32) by referring to the assistance electrical current diagram shown in FIG. 4. This assistance electrical current diagram is stored within the ROM of the electronic control device 40; the basic assistance electrical current Ias is set so that, according to increase of the steering torque TR, it also increases, and moreover so that it attains a larger value as the vehicle speed V becomes lower.

Next, the power supply voltage is detected, and a decision is made (in a step S33) as to whether or not the detected voltage Vx is decreasing below a reference voltage Vr. This reference voltage Vr may be set as desired, or may also be set to be the same as the set value of the reference voltage V1 of the first embodiment, or the like.

And, if the detected voltage Vx is greater than or equal to the reference voltage Vr, then it is considered that the power supply device 70 is operating satisfactorily, and the basic assistance electrical current which has been calculated in the step S32 is supplied to the electric motor 15 (in a step S37), and this control routine temporarily terminates. Accordingly, by supplying electric power to the electric motor 15, an optimum steering assistance torque is obtained according to the running state of the vehicle.

When, upon repetition of the above processing, the power supply voltage decreases and the detected voltage Vx drops below the reference voltage Vr (YES in the step S33), then a decision is made (in the step S34) as to whether or not the vehicle is running. This decision is made according to whether or not the vehicle speed, as based upon the vehicle speed signal from the vehicle speed sensor 28, is greater than a predetermined speed; the predetermined speed in this case does not necessarily only mean zero (stopped), but may also be a predetermined speed V0 which constitutes low speed running. In other words, it would also be acceptable to arrange for the decision in the step S34 as to whether or not the vehicle is running to be made according as to whether or not the detected vehicle speed Vx is greater than a low speed running speed V0.

Next, in order to return to elevation of the power supply voltage, the upper limit value of the assistance electrical current is reduced by one step, but it is arranged for this reduction ratio to be different when the vehicle is running, from when it is stationary. In other words, if the vehicle is stopped, the reduction ratio (or the reduction width) of the assistance electrical current upper limit value is set to be large (in a step S35), while, if the vehicle is running, the reduction ratio of the assistance electrical current upper limit value is set to be small (in a step S36).

For example, the upper limit electrical current value while the vehicle is running may be made to be (n−1)/n times the upper limit electrical current value the time directly before, while the upper limit electrical current value while the vehicle is stationary may be made to be (m−1)/m times the upper limit electrical current value the time directly before (with n>m).

And an assistance electrical current within the range limited by this upper limit electrical current value is supplied to the electric motor 15. In other words, if the basic assistance electrical current Ias which has been calculated in the step S32 is greater than the upper limit electrical current value Ilim, then an electrical current equal to the upper limit electrical current value Ilim is supplied to the electric motor 15, while, if the basic assistance electrical current Ias which has been calculated in the step S32 is smaller than the upper limit electrical current value Ilim, then this basic assistance electrical current Ias is supplied to the electric motor 15.

Decrease of the power supply voltage is suppressed by this type of processing being repeated, and, when the power supply voltage recovers and reaches the reference voltage Vr, the reduction of the upper limit electrical current value Ilim is terminated.

Figure 12:
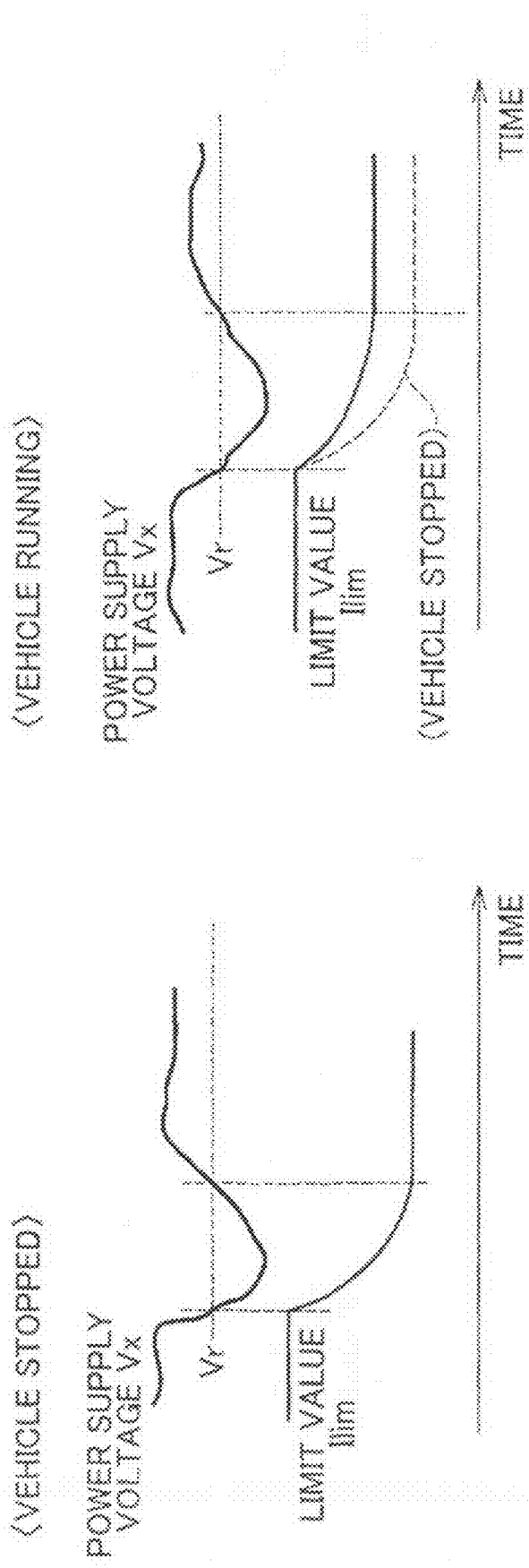
FIG. 12 is a graph illustrating transition of a power supply voltage and an upper limit electrical current value, in this second embodiment.

Generally, decrease of the power supply voltage is invited during steering when the running speed is low and a correspondingly large steering assistance torque is required, but since, in this second embodiment, as shown in FIG. 12, the speed at which the upper limit electrical current value Ilim is reduced is made quicker when the vehicle is stopped as compared to during vehicle running, accordingly it is possible to suppress decrease of the power supply voltage in an extremely effective manner. On the other hand, since, when the vehicle is running, the speed at which the upper limit electrical current value Ilim is reduced is made to be slow, accordingly it becomes difficult for a sense of discomfort to be imparted to the driver during steering actuation.

As a result, it is possible to anticipate a good balance between suppression of decrease of the power supply voltage, and ensuring good steering actuation characteristics.

It should be understood that this reduction of the upper limit electrical current value Ilim need not necessarily be performed at a speed which corresponds to the vehicle speed.

Moreover, it would also be acceptable to arrange to set the voltage value when starting the reduction of the upper limit electrical current value Ilim (the reference voltage Vr), and the voltage value when terminating the reduction of the upper limit electrical current value Ilim, so that they are different from one another.

Although various embodiments of the electric power steering device 1 have been explained above, the present invention is not to be considered as being limited to these embodiments described above; various changes may be made in the present invention, provided that its gist is not departed from.

The invention claimed is:

1. An electric power steering device, comprising:
 an electric actuator which is supplied with power from a power supply device to generate a predetermined steering assistance force for a steered wheel;
 an actuator controller which controls the amount of electrical power supplied to the electric actuator, according to the steering state of a steering wheel; and
 a power supply voltage detector which detects the power supply voltage of the power supply device,
 wherein the actuator controller comprises a voltage maintenance controller which controls the electrical current supplied to the electric actuator, so as to maintain the power supply voltage greater than or equal to a set voltage which is set in advance,
 wherein the voltage maintenance controller adjusts the electrical current amount supplied to the electric actuator based upon the deviation between the detected power supply voltage and the set voltage, and performs feedback control based upon the deviation between the detected power supply voltage and the set voltage so that the power supply voltage becomes equal to the set voltage.

2. The electric power steering device according to claim 1, wherein, in the adjustment of the electrical current amount supplied to the electric actuator, an upper limit value for the electric current which flows to the electric actuator is adjusted.

3. The electric power steering device according to claim 2, wherein the voltage maintenance controller adjusts the upper limit electrical current for the electric actuator, and performs feedback control so that the power supply voltage becomes equal to the set voltage, based upon a proportional element and a differentiation element for the deviation between the detected power supply voltage and the set voltage, or based upon a proportional element for the deviation and a differentiation element for the power supply voltage.

4. The electric power steering device according to claim 3, wherein at least one of a proportional gain and a differential gain of the feedback control is set to values which are different between the case of performing control on the side to reduce the upper limit electrical current value of the electric actuator, and the case of performing control on the side to increase the upper limit electrical current value of the electric actuator.

5. The electric power steering device according to claim 4, wherein at least one of the proportional gain and the differential gain is set to a value which is smaller in the case of performing control on the side to reduce the upper limit electrical current value of the electric actuator, than in the case of performing control on the side to increase the upper limit electrical current value of the electric actuator.

6. The electric power steering device according to claim 3, wherein, if the power supply voltage detected by the power supply voltage detector is higher than a predetermined voltage, the voltage maintenance controller adjusts the upper limit electrical current value for the electric actuator, and performs feedback control so that the power supply voltage becomes equal to the set voltage, not based upon the differentiation element, but based upon the proportional element.

7. The electric power steering device according to claim 2, wherein at least one of a proportional gain and a differential gain of the feedback control is set according to the detected power supply voltage.

8. The electric power steering device according to claim 2, wherein the actuator controller operates the voltage maintenance controller, when the power supply voltage detected by the power supply voltage detector has decreased down to a predetermined feedback control starting voltage.

9. The electric power steering device according to claim 8, wherein, when the detected power supply voltage has risen up to a feedback control ending voltage which is higher than the feedback control starting voltage, the actuator controller, along with terminating the feedback control, also increases the upper limit electrical current value for the electric actuator at a predetermined speed.

10. The electric power steering device according to claim 1, further comprising a power supply maintenance device which, in response to decrease of the power supply voltage of the power supply device, slows down the decrease of the power supply voltage which is supplied to the actuator controller,
wherein the voltage maintenance controller has a control responsiveness, if the power supply voltage has dropped below the minimum drive voltage of the actuator controller, which is faster than the time interval over which the power supply voltage to the actuator controller can be maintained greater than or equal to the minimum drive voltage by the power supply maintenance device.

11. The electric power steering device according to claim 1, further comprising a filter which eliminates noise included in the voltage signal detected by the power supply voltage detector, or in the deviation signal between the detected power supply voltage and the set voltage.

12. The electric power steering device according to claim 11, wherein the filter is a low pass filter.

13. The electric power steering device according to claim 1, wherein, when the detected power supply voltage has decreased down to a predetermined voltage, the voltage maintenance controller reduces the upper limit value of the electrical current supplied to the electric actuator at a predetermined speed, until the power supply voltage becomes greater than or equal to the set voltage.

14. The electric power steering device according to claim 13, further comprising a vehicle speed detector which detects the running speed of the vehicle, wherein the voltage maintenance controller determines the speed of reduction of the upper limit value of the electrical current supplied to the electric actuator, according to the detected vehicle speed.

15. The electric power steering device according to claim 14, wherein the speed of reduction of the upper limit value of the electrical current supplied to the electric actuator is slower when the detected vehicle speed is greater than a predetermined speed, as compared to when the detected vehicle speed is not greater than the predetermined speed.

16. A method for maintaining the function of an electric power steering device comprising an electric actuator, comprising:
supplying an electric actuator with power from a power supply device to generate a predetermined steering assistance force for a steered wheel;
controlling the amount of electrical power supplied to the electric actuator, according to the steering state of a steering wheel;
detecting the power supply voltage of the power supply device; and
controlling the electrical current supplied to the electric actuator so as to maintain the power supply voltage greater than or equal to a set voltage which is set in advance
wherein controlling the electrical current supplied to the electric actuator includes
adjusting the electrical current amount supplied to the electric actuator, based upon the deviation between the detected power supply voltage and the set voltage, and
performing feedback control based upon the deviation between the detected power supply voltage and the set voltage so that the power supply voltage becomes equal to the set voltage.

* * * * *